United States Patent
Kim et al.

(10) Patent No.: US 6,876,419 B2
(45) Date of Patent: *Apr. 5, 2005

(54) MULTI-DOMAIN LIQUID CRYSTAL DISPLAY INCLUDING POLARIZING PLATE HAVING POLARIZING DIRECTIONS NEITHER PARALLEL NOR PERPENDICULAR TO AVERAGE ALIGNMENT DIRECTION OF MOLECULES

(75) Inventors: Kyeong-Hyeon Kim, Yongin (KR); Jung-Uk Shim, Yongin (KR); Seung-Beom Park, Yongin (KR); Jang-Kun Song, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/724,703

(22) Filed: Dec. 2, 2003

(65) Prior Publication Data

US 2004/0114084 A1 Jun. 17, 2004

Related U.S. Application Data

(63) Continuation of application No. 08/971,674, filed on Nov. 17, 1997, now Pat. No. 6,704,083, which is a continuation-in-part of application No. 08/891,499, filed on Jul. 11, 1997, now Pat. No. 6,181,402.

(30) Foreign Application Priority Data

May 30, 1997 (KR) .............................. 97-22308
Jun. 24, 1997 (KR) .............................. 97-26861
Oct. 7, 1997 (KR) .............................. 97-51338

(51) Int. Cl.[7] ..................... G02F 1/1337; G02F 1/1335; G02F 1/1343
(52) U.S. Cl. ..................... 349/129; 349/96; 349/99; 349/141; 349/143

(58) Field of Search .................... 349/96, 99, 129, 349/130, 139, 141, 143

(56) References Cited

U.S. PATENT DOCUMENTS 3,807,831 A    4/1974   Soref ...................... 349/141

(Continued)

FOREIGN PATENT DOCUMENTS

FR              288363         5/1976

(Continued)

OTHER PUBLICATIONS

Lindquist R.G. et al., "High–Resolution Liquid–Crystal Phase Grating Formed by Fringing Fields From Interdigitated Electrodes", vol. 19. pp. 670–672, XP000442237, May 1, 1994.

Primary Examiner—Tarifur R. Chowdhury
(74) Attorney, Agent, or Firm—Volentine Francos & Whitt, PLLC (57) ABSTRACT

A liquid crystal display includes a first substrate having a plurality of pixels, a second substrate facing the first substrate, polarizing plates attached to outer surfaces of the two substrates, and a liquid crystal material injected into the gap between the two substrates, molecules of the liquid crystal material being initially aligned perpendicularly to the substrates. Each pixel is divided into a plurality of domains distinguished by an average alignment direction of liquid crystal molecules included therein when an electric field is applied to the liquid crystal material. On average, liquid crystal molecules located at an edge of the domains are aligned symmetrically to each other with respect to a boundary of the domains. Polarizing directions of the polarizing plates are either perpendicular or parallel to each other, but neither parallel nor perpendicular to at least one of the average alignment directions of the liquid crystal molecules of the domains.

12 Claims, 12 Drawing Sheets

When voltage is applied

U.S. PATENT DOCUMENTS

| | | | |
|---|---|---|---|
| 5,099,345 A | 3/1992 | Kozaki et al. | 349/101 |
| 5,233,449 A | 8/1993 | Shioji et al. | 349/108 |
| 5,541,753 A | 7/1996 | Raynes et al. | 349/117 |
| 5,598,285 A | 1/1997 | Kondo et al. | 349/39 |
| 5,654,782 A | 8/1997 | Morokawa et al. | 349/143 |
| 5,668,651 A | 9/1997 | Yamada et al. | 349/156 |
| 5,745,207 A | 4/1998 | Asada et al. | 349/141 |
| 5,757,455 A | 5/1998 | Sugiyama et al. | 349/129 |
| 5,831,707 A | 11/1998 | Ota et al. | 349/141 |
| 5,841,499 A | 11/1998 | Baur et al. | 349/141 |
| 5,886,762 A | 3/1999 | Lee et al. | 349/141 |
| 5,892,562 A | 4/1999 | Yamazaki et al. | 349/141 |
| 5,905,556 A | 5/1999 | Suzuki et al. | 349/141 |
| 5,914,761 A | 6/1999 | Ohe et al. | 349/138 |
| 5,959,707 A * | 9/1999 | Murai et al. | 349/129 |
| 6,191,837 B1 * | 2/2001 | Fujimaki et al. | 349/141 |
| 6,437,844 B1 * | 8/2002 | Hattori et al. | 349/129 |
| 6,469,763 B2 | 10/2002 | Kim et al. | 349/128 |

FOREIGN PATENT DOCUMENTS

| | | |
|---|---|---|
| FR | 2764085 | 4/1998 |
| GB | 1475378 | 1/1977 |
| JP | (A) 53-89753 | 1/1977 |
| JP | 53-89753 | 8/1978 |
| JP | 57-000618 A | 1/1982 |
| JP | 58-2872 | 1/1983 |
| JP | 08313923 | 11/1996 |

OTHER PUBLICATIONS

Aratani S. et al., "Complete Suppression Of Color Shift In In-Plane Switching Mode Liquid Crystal Displays With A Multidomain Structure Obtained by Unidirectional Rubbing", vol. 36, pp. L27–L29, XP000736552, Jan. 15, 1997.

* cited by examiner

FIG.1A (Prior Art)

When voltage is not applied

FIG.1B (Prior Art)

When voltage is applied

FIG.2A

When voltage is
not applied

FIG.2B

When voltage is
applied

When voltage is not applied

FIG.3B

When voltage is applied

MULTI-DOMAIN LIQUID CRYSTAL DISPLAY INCLUDING POLARIZING PLATE HAVING POLARIZING DIRECTIONS NEITHER PARALLEL NOR PERPENDICULAR TO AVERAGE ALIGNMENT DIRECTION OF MOLECULES

CROSS REFERENCE TO RELATED APPLICATIONS

This application is a continuation of application Ser. No. 08/971,674, filed on 17 Nov. 1997 now U.S. Pat. No. 6,704,083, which is hereby incorporated by reference in its entirety for all purposes as if fully set forth herein, and which in turn is a continuation-in-part of application Ser. No. 08/891,499, filed on 11 Jul. 1997 now U.S. Pat. No. 6,181,902. This application also claims priority under U.S.C. §119 from: Korean Patent Application No. 97-22308, filed on 30 May 1997; Korean Patent Application No. 97-26861, filed on 24 Jun. 1997; and Korean Patent Application No. 97-51338, filed on 7 Oct. 1997.

BACKGROUND OF THE INVENTION (a) Field of the Invention

The present invention relates to a liquid crystal display having a wide viewing angle.

(b) Description of the Related Art

Generally, a conventional liquid crystal display (LCD) includes two substrates having electrodes and liquid crystal injected therebetween. The voltage difference between the electrodes yields an electric field, and the molecules of the liquid crystal are re-arranged by the electric field. The polarization of incident light is varies due to the re-arrangement of the liquid crystal molecules.

Hereinafter, the conventional LCD is explained in detail with reference to the accompanying drawings.

Figure 1A:
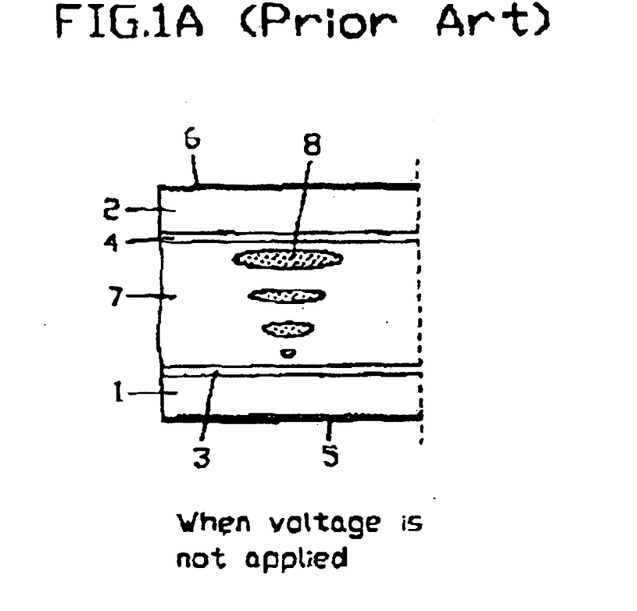
FIGS. 1A and 1B are sectional views of a conventional TN-LCD.
Figure 1B:
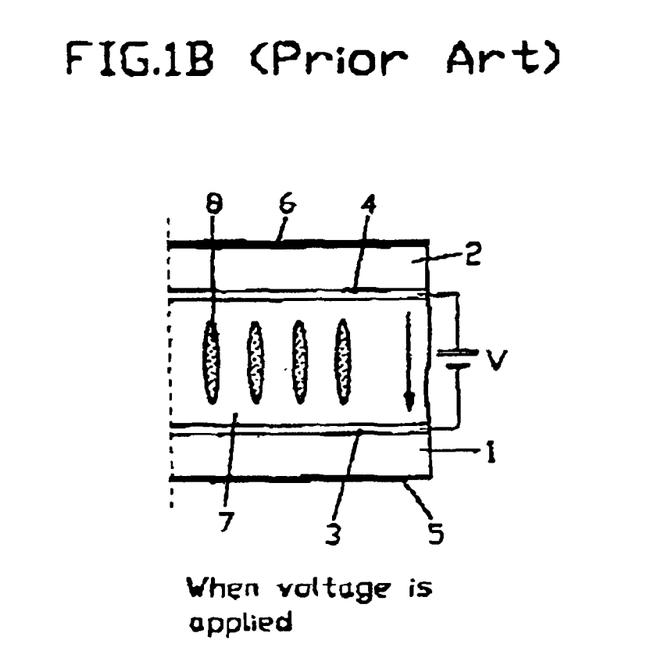

FIGS. 1A and 1B are sectional views of a conventional twisted-nematic liquid crystal display (TN-LCD). The TN-LCD in FIG. 1A includes transparent glass substrates 1 and 2 facing each other, a liquid crystal layer 7 inserted between the substrates 1 and 2, and electrodes 3 and 4 formed respectively on the inner surfaces of the substrates 1 and 2, and polarizing plates 5 and 6 or polarizing the light are attached to the outer surfaces of the glass substrates 1 and 2 respectively.

The electrode 3 of the lower substrate 1 is a pixel electrode, the electrode 4 of the upper substrate 2 is a common electrode, and dielectric anisotropy $\Delta\varepsilon$ of the liquid crystal layer 7 is positive.

In the absence of an electric field, the long axes of the liquid crystal molecules 8 of the liquid crystal layer 7 are parallel to the substrates 1 and 2, and the liquid crystal molecules 8 are twisted spirally from one substrate to the other substrate.

When a power V is connected to the electrodes 3 and 4, and a sufficient electric field is applied to the liquid crystal layer 7 In the direction of the arrow as illustrated in FIG. 1B, the long axes of the liquid crystal molecules 8 are parallel to the direction of the electric field. This type of TN-LCD unfortunately results in having a narrow viewing angle.

SUMMARY OF THE INVENTION

An object of the present invention is to provide a liquid crystal display (LCD) having a wide viewing angle to substantially obviate the problems associated with the related art.

An LCD according to embodiments of the present invention includes a liquid crystal material between first end second substrates, and the liquid crystal molecules are perpendicular to the two substrates. First and second electrodes are formed on one of the two substrates and substantially parallel to each other.

Alignment films for aligning molecular axes of the liquid crystal molecules to be perpendicular to the substrates may be formed on the first and/or the second substrates, end the alignment films may be or may not be rubbed.

In addition, the LCD) of the present invention may further include polarizing plates, and the polarizing directions of the polarizing plates are either parallel or perpendicular to each other.

Here, the dielectric anisotropy of the liquid crystal material may be positive or negative, and the liquid crystal may be at least one among pure nematic liquid crystal, chiral nematic liquid crystal and nematic liquid crystal having chiral dopants.

When voltage is applied to the two electrodes of the LCD of the present invention, a parabolic, electric field is generated between the two electrodes, and the liquid crystal molecules are re-arranged in response to the electric field.

The liquid crystal display described above is called an electrically-induced optical compensation liquid crystal display (EOC-LCD) hereinafter.

In the EOC-LCD according to the embodiments of the present invention, the liquid crystal molecules are symmetrically aligned to the surface which is equal distance from each of the electrodes. Accordingly, the phase retardation of the transmitted light is symmetrically compensated, thereby obtaining a wide viewing angle.

The electrodes are preferably bent to form a saw shape in a pixel or by pixel in order to vary the orientations of the liquid crystal molecules.

When using the cross polarizing plates, it is preferable that the polarizing directions of the polarizing plates are neither parallel nor perpendicular to the directions of the electrodes. It is more preferable that the angle between the polarizing directions of the polarizing plates and the electrodes is 45 degrees.

The bent angle of the electrodes may be between zero and 180 degrees; but it is most preferable tat the bent angle of the electrodes is 90 degrees.

Additional objects and advantage of the present invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate embodiments of the present invention and, together with the description, serve to explain the principles of the invention.

DETAILED DESCRIPTION OF THE PREFERRED EMBODIMENTS

Embodiments of the present invention will become apparent from a study of the following detailed description when viewed in light of drawings.

FIGS. 2A to 2C and 3A to 3C illustrate basic driving principles of EOC-LCDs according to a first and a second embodiment of the present invention.

Referring to FIGS. 2A to 2C and 3A to 3C, a pair of transparent glass substrates 10 and 20 respectively having alignment films 90 are facing each other. Two linear electrodes 30 and 40 parallel to each other are formed on the inner surface of the lower substrate 10 of the substrates 10 and 20. The liquid crystal layer 70 is injected between the substrate 10 and 20. The liquid crystal molecules 80 of the liquid crystal layer 70 are homeotropically aligned, and thus they are perpendicular to the substrates 10 and 20. The liquid crystal molecules 80 may have a pre-tilt angle with respect to the substrates 10 and 20. The electrodes 30 and 40 may be transparent or opaque conductive material. Two polarizing plates 50 and 60, which polarize the incident light, are attached to the outer surfaces of the glass substrates 10 and 20 respectively.

Figure 2A:
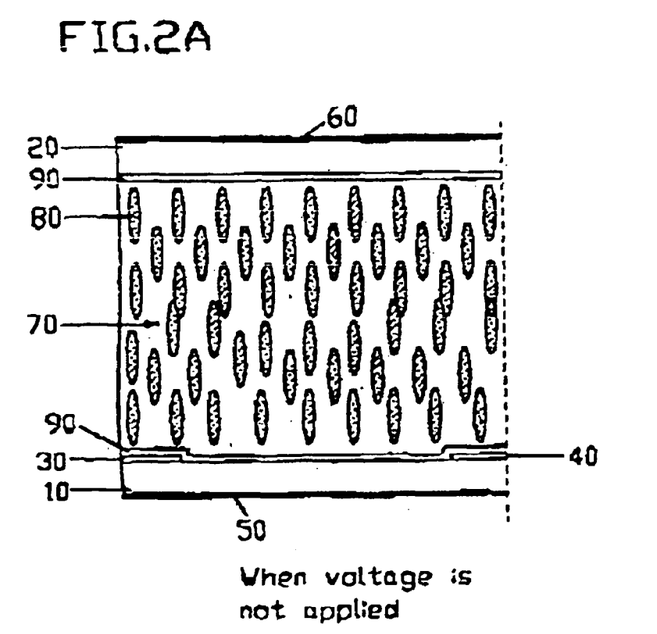
FIGS. 2A to 2C and 3A to 3C illustrate basic driving principles of EOC-LCDs according to a first and a second embodiment of the present invention.
Figure 3A:
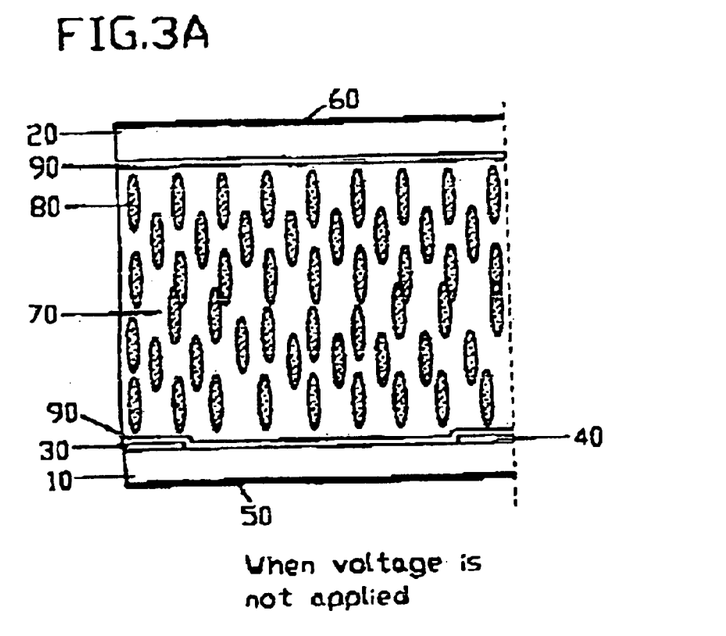

One of the two electrodes 30 and 40 is a pixel electrode for receiving data signals, and the other is a common electrode for receiving a common signal. Each pixel electrode is connected to a terminal of a switching device, such as a thin film transistor, formed in each pixel.

Although the dielectric anisotropy $\Delta\epsilon$ of the liquid crystal layer 70 may preferably be positive, it may be negative. The liquid crystal material may be at least one among nematic liquid crystal, chiral nematic liquid crystal and nematic liquid crystal having left-handed or right-handed chiral dopants.

Either or both alignment films 90 may be rubbed so that the liquid crystal molecules 80 may be tilted in a predetermined direction in the presence of an electric field. However, none of the alignment films 90 may be rubbed. The rubbing direction is arbitrary and, however, it is preferable to rub the two alignment films in opposite directions when both of them are rubbed.

The polarizing directions of the polarizing plates 50 and 60 are either parallel to or perpendicular to each other.

It is preferable that the width of the electrodes 30 and 40 lies between 1 and 10 μm, that the distance between the two electrodes 30 and 40 lies between 2 and 20 μm, and that the thickness of the liquid crystal layer 70 is in the range between 1 and 15 μm.

Figure 2B:
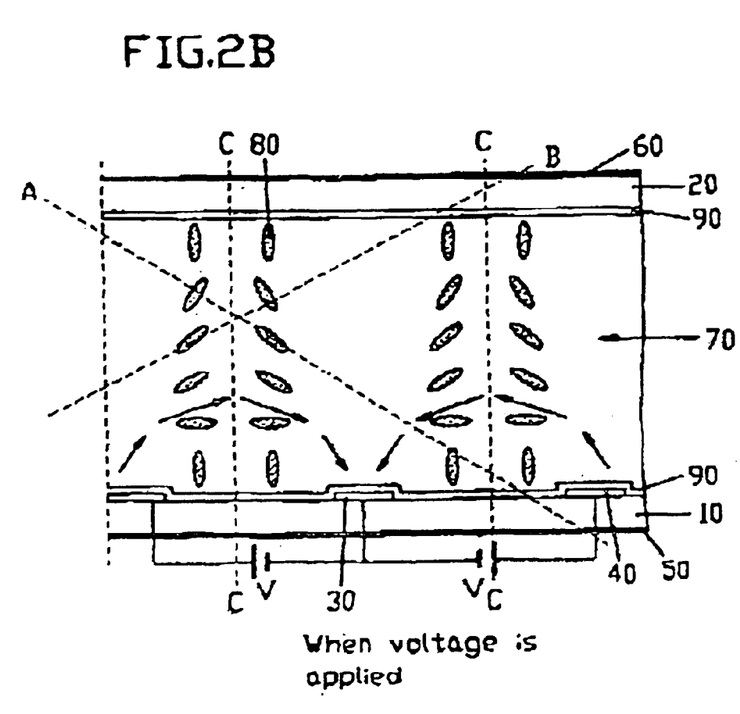
Figure 2C:
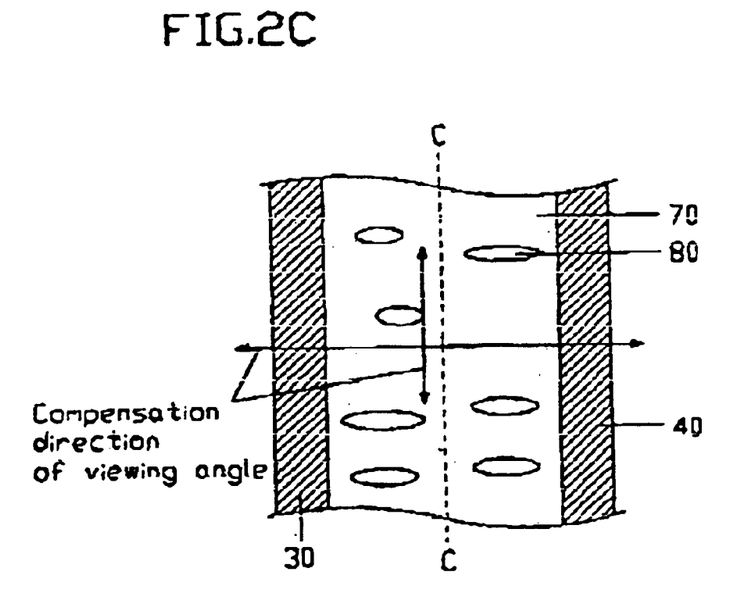
Figure 3B:
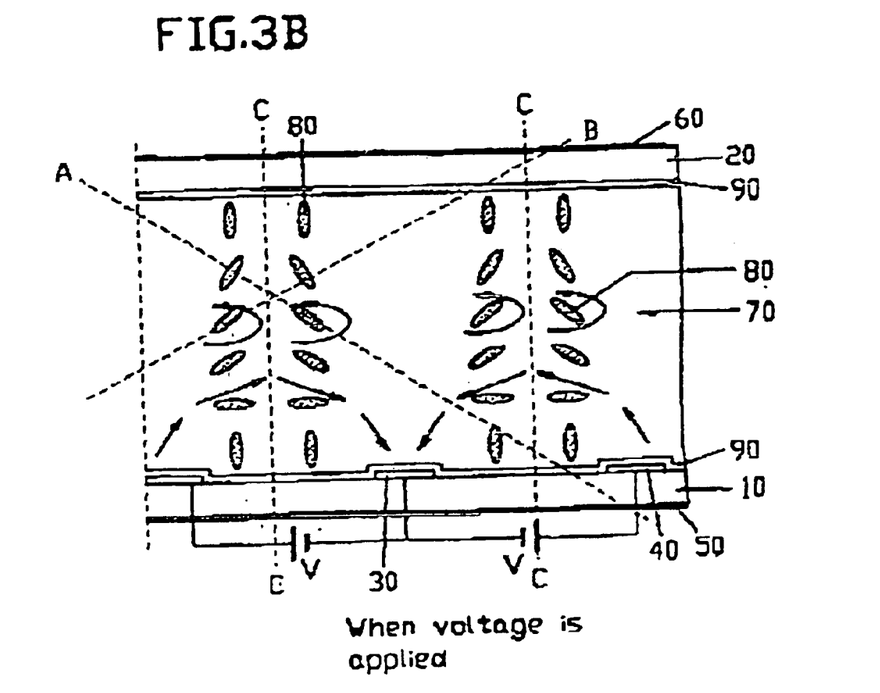
Figure 3C:
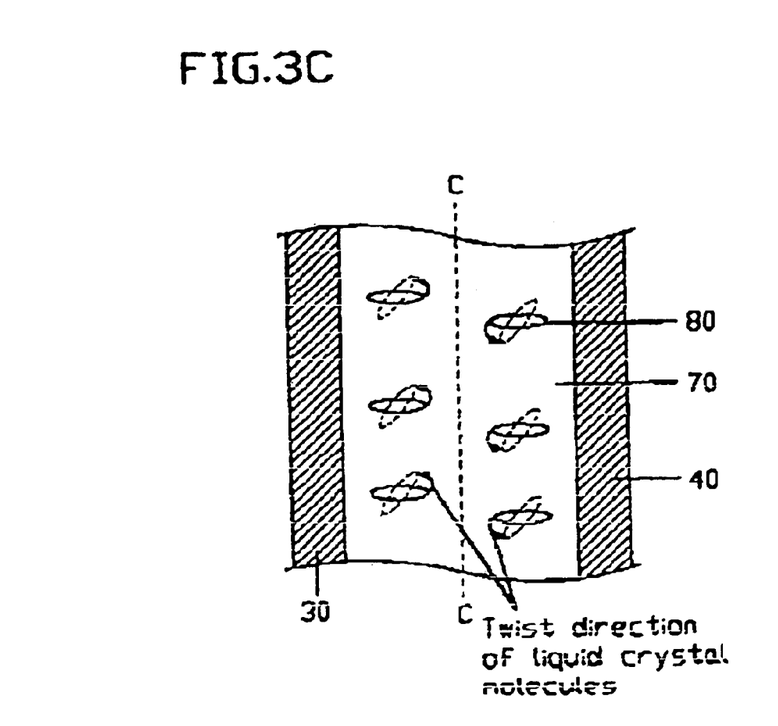

In FIGS. 2A to 2C, the liquid crystal material is pure nematic liquid crystal which has positive dielectric anisotropy, and the alignment layers 90 are not rubbed or they are rubbed in a direction perpendicular to the electrodes 30 and 40. In FIGS. 3A to 3C, the liquid crystal material is either nematic liquid crystal having chiral dopants and positive anisotropy or chiral nematic liquid crystal having positive anisotropy. Even though the liquid crystal material is a pure nematic liquid crystal, in case that the alignment layers are rubbed in a direction which is not perpendicular to the electrodes 30 and 40, the arrangement of the liquid crystal molecules 80 is similar to that in FIGS. 3b and 3C.

As shown in FIGS. 2A and 3A, in the absence of the electric field, the liquid crystal molecules 80 of the liquid crystal layer 70 are perpendicular to the substrates 10 and 20 due to the aligning force of the alignment films 90.

The light passing through the polarizing plate or polarizer 50 attached to the lower substrate 10 passes through the liquid crystal layer 70 without changing its polarization. The light passes through the polarizing plate or analyzer 60 attached to the upper substrate 2 if the polarizing directions of the polarizer 50 and the analyzer 60 are parallel to each other. However, the light is blocked by the analyzer 60 if the polarizing directions of the polarizer 50 and the analyzer 60 are perpendicular to each other.

FIGS. 2B and 3B show arrangements of the liquid crystal molecules 80 when sufficient electric field is applied, and FIGS. 3C and 4C are elevational views thereof. The electric field at a boundary-plane C—C consisting of the points equal distance from each of the two electrodes 30 and 40 is substantially parallel to the two substrates 10 and 20 and is perpendicular to the two electrodes 30 and 40. As the electric field moves away from the boundary plane and moves toward of the electrodes 30 and 40. It curves gradually more downward. That is, the electric field assumes a downward parabolic shape. However, the horizontal component of the electric field is perpendicular to the electrodes 30 and 40.

The long axes of the liquid crystal molecules 80 is to be aligned along me direction of the electric field since the liquid crystal material has positive dielectric anisotropy. However, the liquid crystal molecules 80 adjacent to the substrates 10 and 20 maintain their original orientation, in which they are aligned perpendicular to the substrates 10 and 20, since the aligning force of the alignment film 90 is stronger than the force due to the electric field. Accordingly, the liquid crystal molecules change their tilt angles to balance the force of the electric field and the aligning force when the pure nematic liquid crystal material is used.

In addition, the liquid crystal layer 70 between the two electrodes 30 and 40 has at least two adjacent regions divided by the boundary plane C—C. The liquid crystal molecules 80 in a region are aligned in the same direction. and the liquid crystal molecules 80 in the two regions are aligned symmetrically with respect to the boundary pane C—C since the electric field between the two electrodes 30 and 40 has the parabolic shape as a whole having an apex on the boundary plane C—C.

Accordingly, as shown in FIGS. 2B and 2C, a viewing angle in the direction perpendicular to the electrodes 30 and 40 is enlarged since the phase retardation of the light passing through the liquid crystal layer 70 is symmetrically compensated. The viewing angle in the direction parallel to the electrodes 30 and 40 is also enlarged since the refractive index in the direction of short axes of the liquid crystal molecules 80 has little variation.

On the other hand, since the electric field at the boundary plane C—C is formed parallel to the substrates 10 and 20, and thus perpendicular to the long axes of the liquid crystal molecules 80, the liquid crystal molecules 80 on the boundary-plane do not rotate.

Next, as shown in FIGS. 3B and 3C, the behaviors of the liquid crystal molecules becomes different when the chiral nematic liquid crystal or the nematic liquid crystal having chiral dopant is used instead of the pure nematic liquid crystal. As those in FIGS. 2B and 2C, the liquid crystal molecules 80 on the boundary plane C—C do not rotate. However, the arrangement of the liquid crystal molecules 80 in both sides of the boundary plane C—C is not completely symmetrical to each other since the long axes of the liquid crystal molecule 80 are changed by the force resulting from chirality as well as the force resulting from the electric field and the alignment force.

That is, in FIG. 2C, the long axes of the liquid crystal molecules 80 are aligned perpendicularly to the electrodes 30 and 40 when viewed from the top but, in FIG. 3C, the liquid crystal molecules 80 in both sides of the boundary plane C—C may be twisted either counterclockwise or clockwise with respect to the adjacent molecules. Accordingly, the wide viewing angle is obtained in both parallel and perpendicular directions to the electrodes 30 and 40.

In the above state, the polarization of the polarized light passing through the polarizer 50 varies according to the twist and tilt of the liquid crystal molecules as the fight passes through the liquid crystal layer 70. Then, a component of the light having a polarization parallel to the analyzer passes through the analyzer 60.

In the above two cases, the polarization can be rotated by ninety degrees by controlling the dielectric anisotropy, the gap between the two substrates 10 and 20, or the pitch of the liquid crystal molecules 80. In this case, if the polarizing directions of the polarizer 50 and the analyzer 60 are parallel to each other, the light is blocked out by the analyzer 60. If the polarizing directions of the polarizer 50 and the analyzer 60 are perpendicular to each other, the light passes through the analyzer 60.

To summarize, the liquid crystal molecules 80 are arranged symmetrically with respect to the boundary plane C—C in the EOC-LCD according to the embodiments of the present invention. Accordingly, the light transmitted in the direction of A and the light transmitted in the direction of B in FIGS. 28 and 3B pass through paths made by the similar arrangement of the liquid crystal molecules 80. Accordingly, the wide viewing angle can be obtained since the retardation with respect to the passing light is formed almost in the same way.

Figure 4:
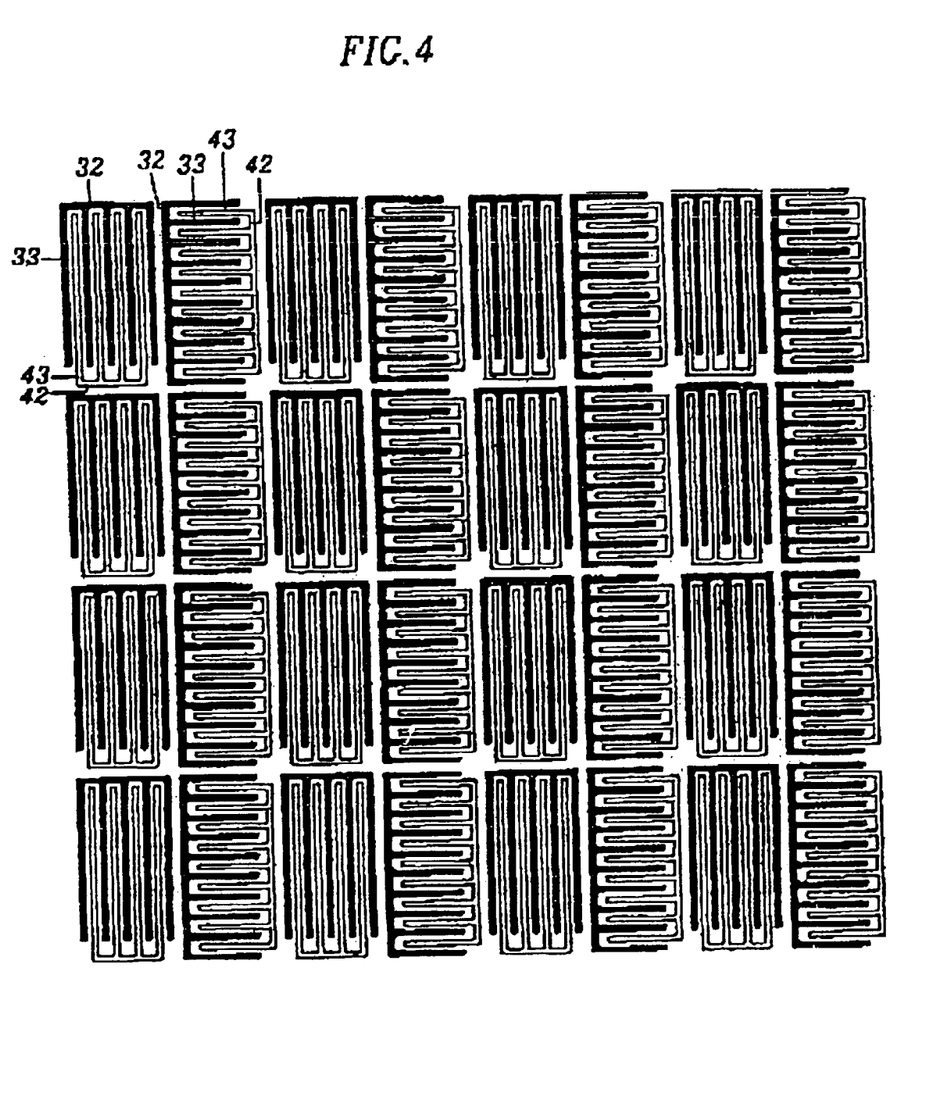
FIGS. 4 to 9 show the shapes of electrodes in the EOC-LCDs according to the embodiments of the present invention.
Figure 9:
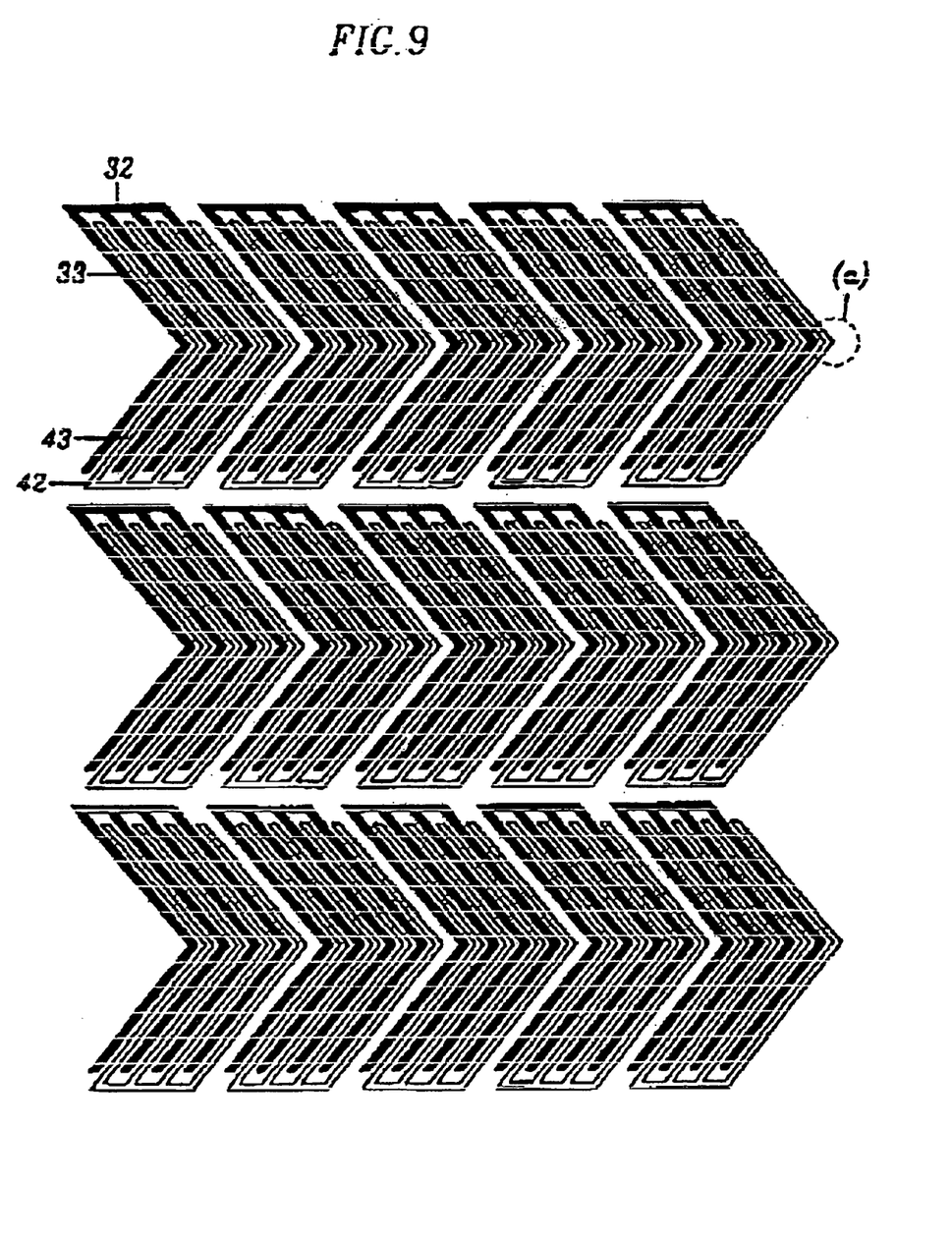

The structure and the arrangement of the electrodes may be varied in various ways in the above type of LCD, and, however, it is preferable to form the electrodes having a saw shape in a pixel or by pixel as illustrated in FIGS. 4 and 9, whereby a very good display characteristic can be obtained. Hereinafter, the structure and the arrangement of the electrodes in rectangular pixels will be explained in detail.

Figure 5:
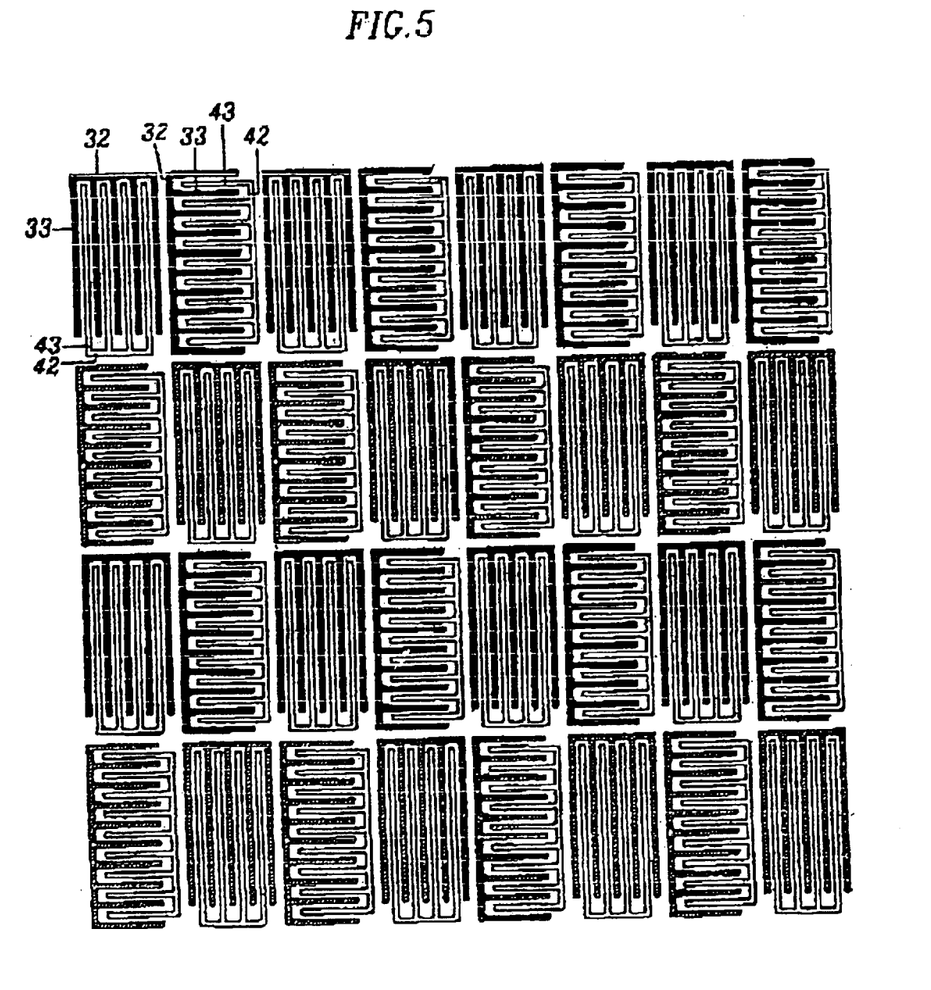

As shown in FIGS. 4 and 5, a first electrode line 32, which is a common electrode line, and a second electrode line 42, which is a pixel electrode line, are parallel to each other in each pixel.

In the embodiment of the present invention Illustrated in FIG. 4, the first and the second electrode lines 32 and 42 facing each other in each pixel are extended in alternate directions along the rows of the pixels, fur example, the first In the transverse direction, the second in the longitudinal direction, the third in the transverse direction, and so on. On the contrary, the electrode lines 32 and 42 are extended in the same direction along the columns of the pixels. First and second electrodes 33 and 43 parallel to each other, the arranged alternately, and extended from the first and the second electrode lines 32 and 42 respectively.

In the embodiment of the present invention illustrated in FIG. 5, the first and the second electrode lines 32 and 42 facing each other in parallel are extended in alternate directions along both the rows and the columns of the pixels, and thus electrode line in all pixels adjacent to a pixel having a transverse electrode line are extended in the longitudinal direction.

Figure 6:
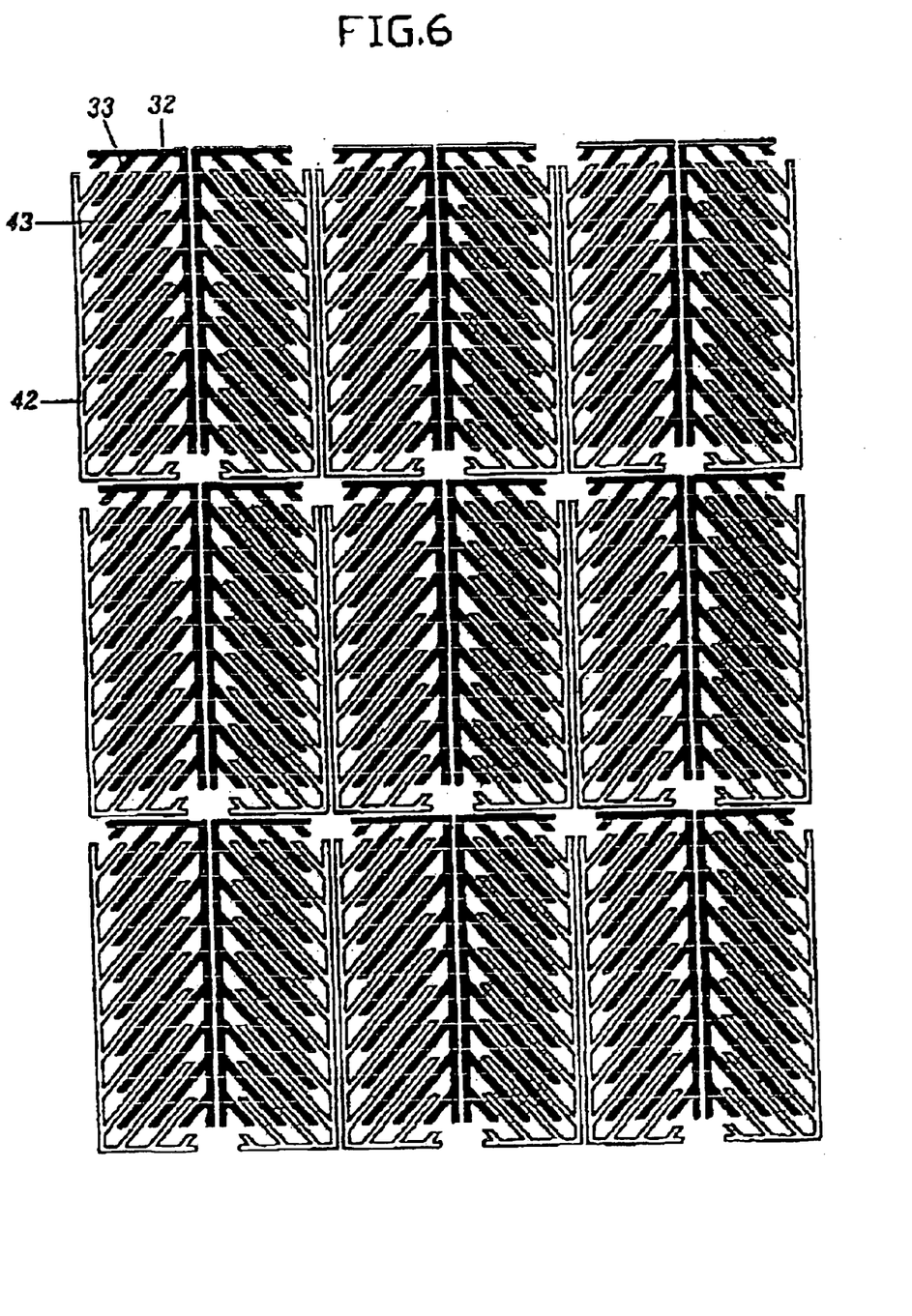
Figure 7:
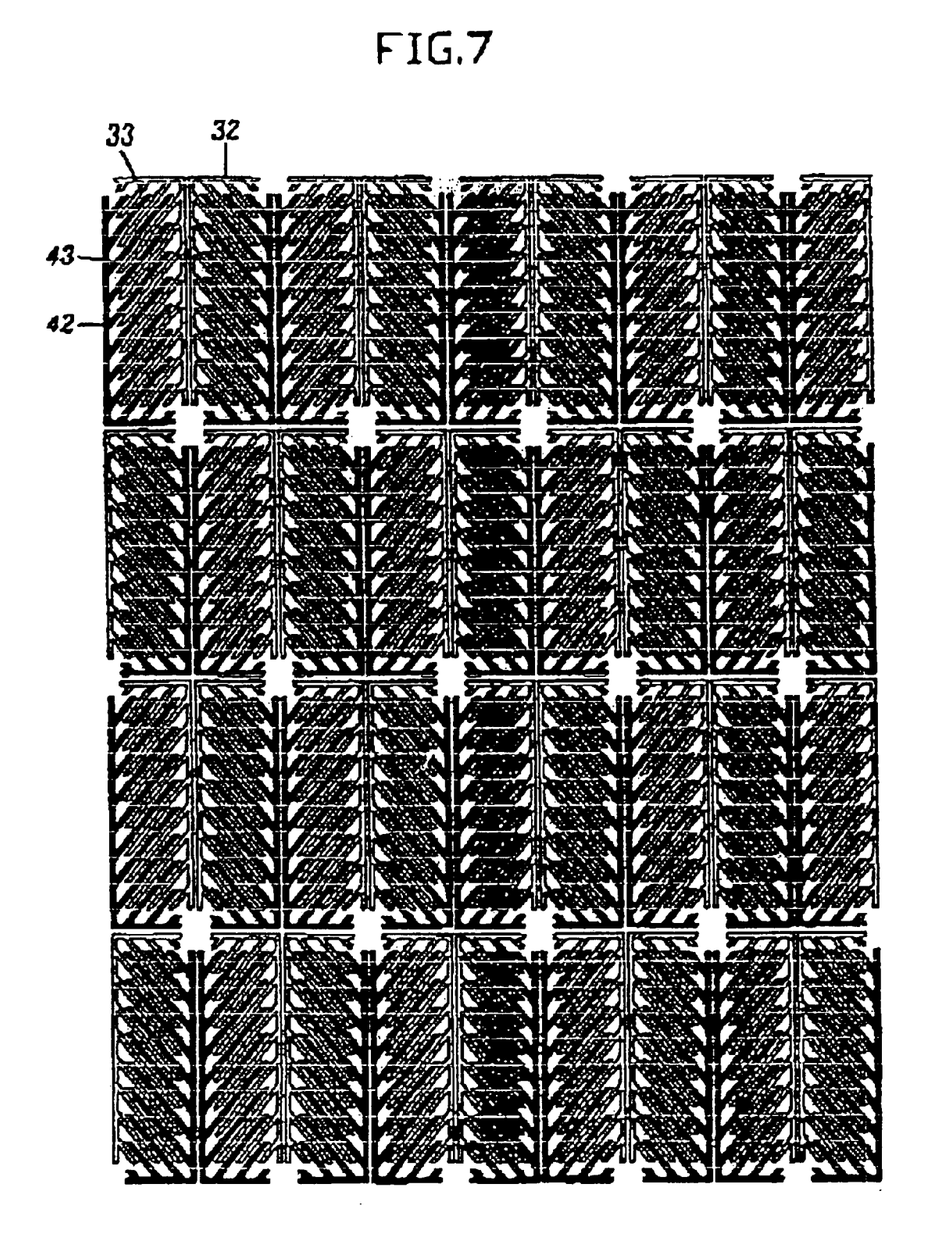

In the embodiments of the present invention illustrated in FIGS. 6 and 7, the first electrode and the second electrode are extended diagonally in each pixel.

As illustrated in FIGS. 6 and 7, the first electrode lines 32, have the shape of either ']' or '[' which is made by extending the electrode lines to the transverse and the longitudinal directions from one peak in the pixels. The second electrode lines 42 have the shape of either 'T' or '[' which is made by extending electrode lines to the transverse and the longitudinal directions from another vertex facing the above mentioned vertex diagonally. The first and the second electrodes 32 and 33 have a rotational symmetry with respect to a diagonal of a pixel.

The first electrodes 33 and the second electrodes 43 parallel to each other are extended from the first electrode line 32 and the second electrode line 42 in directions making angles with the electrode lines 32 and 33, and they are arranged alternately. In the embodiment of the present invention illustrated in FIG. 6, the electrodes 33 and 43 in a pixel makes an angle with the electrodes 33 and 34 in the adjacent pixels along the rows of the pixels, and the first electrode 33 and the second electrode 43 in the same column are extended in the same direction. On the other hand, in the embodiment of the present invention illustrated in FIG. 7, the electrodes 33 and 43 in a pixel makes an angle with those in the adjacent pixels along both the rows and the columns of the pixel.

Figure 8:
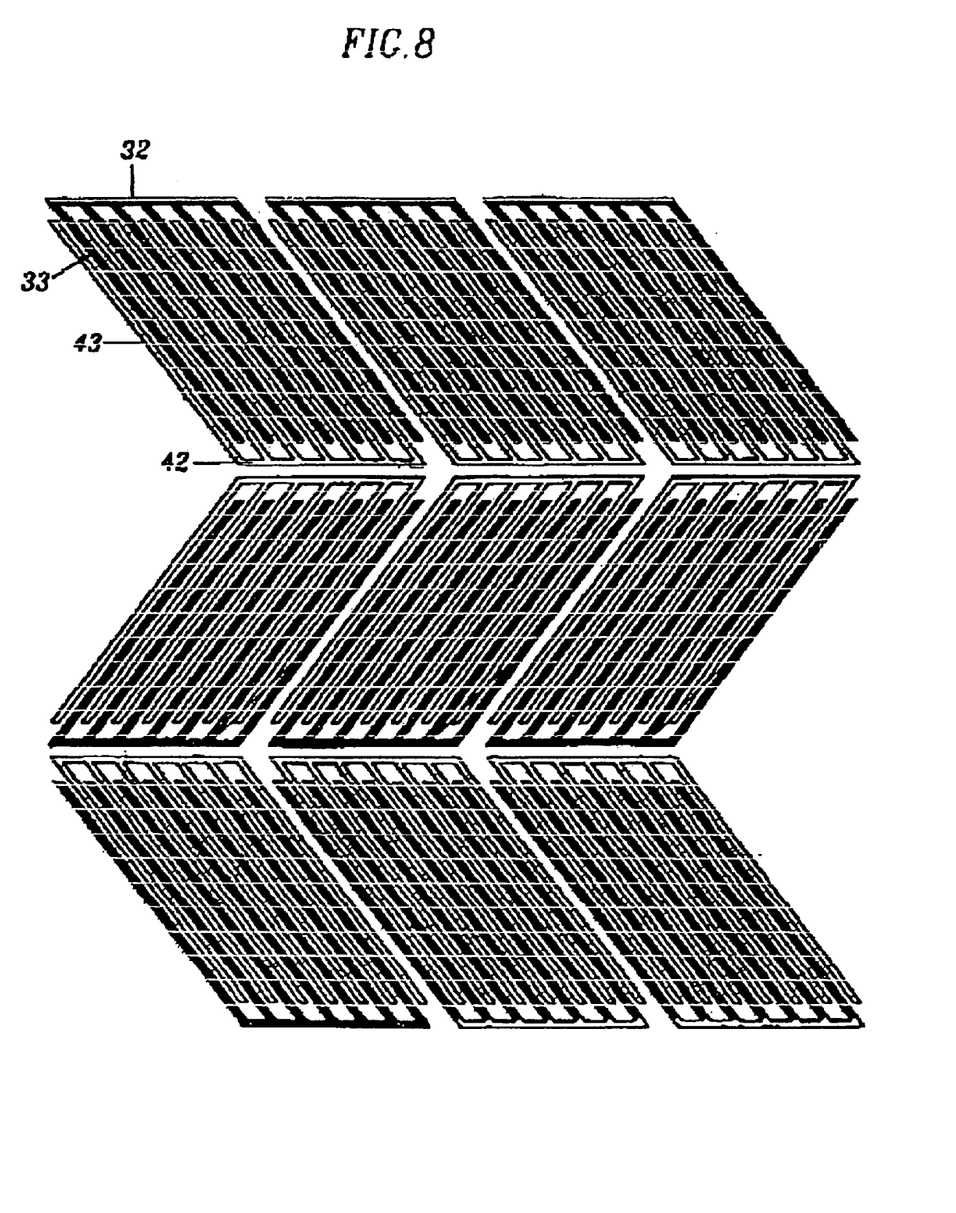

In the embodiment of the present invention as illustrated in FIG. 8, the pixels have parallelogram shapes.

As illustrated in FIG. 8, first electrode lines 32, which are the common electrode lines, and second electrode lines 42, which are the pixel electrode lines, are parallel to each other and extended in the transverse direction. The first electrodes 33 and the second electrodes 43, connected respectively to the first and the second electrode lines 42 and 43 are arranged alternately and parallel to each other, and their extending directions are neither the transverse direction nor the longitudinal direction. The lengths of the electrodes are the same, and thus the pixels have parallelogram shapes. The electrodes 33 and 43 in a row are extended in the same direction, and, however, the electrodes 33 and 43 in adjacent rows are extended in the different directions. For example, as shown in FIG. 8, the electrodes 33 and 43 in the first row are slanted to the right with respect to the directions perpendicular to the electrode lines 32 and 42, but those in the second row are slanted to the left. Accordingly, the first electrode 33 and the second electrode 43 form a saw shape along the rows of the pixel.

In the embodiment of the present invention as illustrated in FIG. 9, the pixel itself has the saw shape.

As illustrated in FIG. 9, each pixel has the saw shape, a central portion of the pixel being bent. A first electrode line 32, which is the common electrode, and a second electrode line 42, which is the pixel electrode, are formed parallel to each other in each pixel, and they face each other.

The first electrodes 33 and the second electrodes 43 connected respectively to the first electrode line 32 and the second electrode line 42 are alternately arranged and they are parallel to each other. The first electrodes 33 and the second electrodes 43 have the saw shape, the central portion in the pixel being bent.

Figure 10:
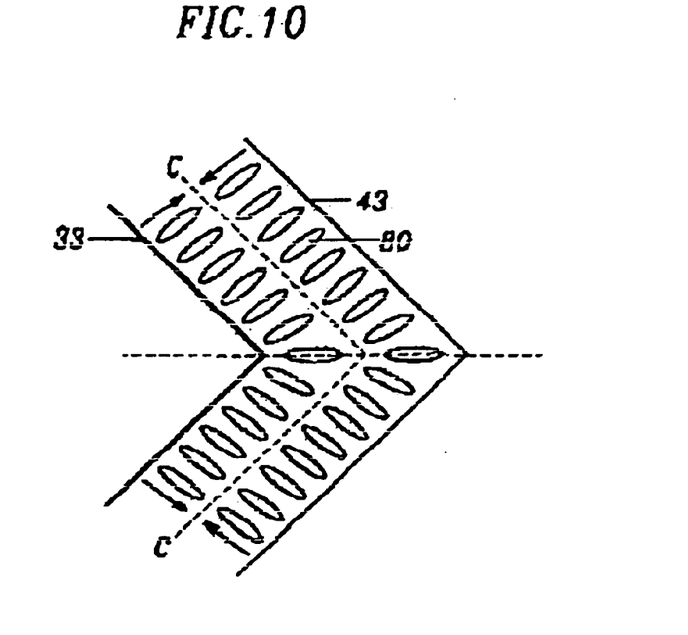
FIG. 10 shows the arrangement of the liquid crystal molecules at (a) portion in FIG. 9.

FIG. 10 is an enlarged view of a bent portion (a) of the electrodes in FIG. 8.

The liquid crystal molecules 80 are driven by the electric field having a parabolic shape when voltage is applied to the first electrode 33 and the second electrode 43. As shown in FIG. 10, a projection of the liquid crystal molecules 80 onto the substrate is perpendicular to the electrodes 33 and 34, and the liquid crystal molecules 80 rise upward in the head of an arrow in FIG. 10. Accordingly, the arrangement of the liquid crystal molecules 80 is symmetrical with respect to the boundary plane C—C. Two pairs of two regions, which are symmetrically aligned on the basis of the boundary plane C—C at both sides of the bent portion, are formed since the electrodes 33 and 43 are bent in the saw shape. Therefore, the LCD has four regions, in which alignments of the liquid crystal molecules 80 are different from one another.

The polarizing directions of the polarizing plates 50 and 60 may be any directions, but is preferable that they are neither parallel to nor perpendicular to a part of the first and the second electrodes 33 and 43. In particular, the display characteristic is the best when the angle formed by the polarizing direction of the polarizing plates 50 and 60 and the electrodes 33 and 43 is 45 degrees.

The bent angle of the first and the second electrodes 33 and 43 having the saw shape may be within a range between 0 to 180 degrees, and it is related to the polarizing directions of the polarizing plates 50 and 60. The bent angle of the electrodes 33 and 43 is 90 degrees when the angle formed by the polarizing directions of the polarizing plates 50 and 60 and the electrodes 33 and 43.

In order to compensate residual phase difference due to the retardation of light, a phase difference compensation film may be attached to the outside of the LCD in accordance with the embodiments of the present invention.

Figure 11:
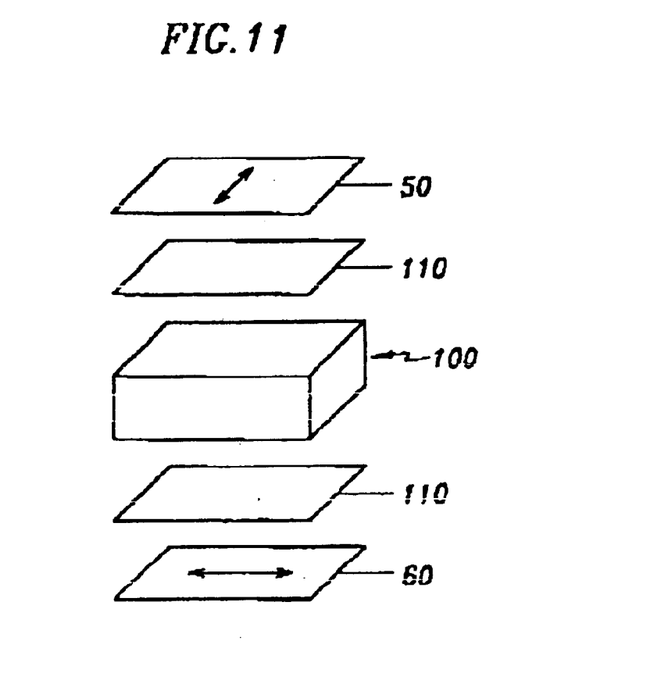
FIG. 11 is an exploded perspective view of an LCD according to the embodiment of the present invention.

FIG. 11 is an exploded perspective view of on LCD according to the embodiment of the present invention, to which compensation films are attached As illustrated in FIG. 11, compensation films 110 are attached between a liquid crystal cell 100 and polarizing plates 50 and 60. The LCD in FIG. 11 has two sheets of the compensation films 110, each being attached between each side of the liquid crystal cell 100 and each polarizing plate 50 or 60 respectively. However, the LCD n have only a compensation film 110 being attached between either of the two sides of the liquid crystal cell and either of the polarizing plates 60 and 60, and the LCD may have at least three sheets of compensation films. A uniaxial or a biaxial compensation film may be used as the compensation film, and a combination of the uniaxial compensation film and the biaxial compensation film may be used.

The electrodes 33 and 43 having the saw shape illustrated in FIGS. 4 to 9 may be adapted to the LCDs of another mode in which the liquid crystal material is driven by the the electrodes parallel to each other. For example, it can be adapted to an in-plane switching (IPS) mode or an electrical induced multi domain (EIMD) mode.

Hereinafter, the IPS-LCD and EIMD-LCD are explained in detail.

In the IPS-LCD, the two electrodes, being parallel to each other, are formed on one substrate as the EOC-LCD. Here, the dielectric anisotropy $\Delta \varepsilon$ of the liquid crystal material may be positive or negative.

In the absence of the electric field, the long axes of the liquid crystal molecules are parallel to the substrates 10 and 20, and are aligned in the direction being parallel to or making a predetermined angle with the electrodes 33 and 43. When sufficient electric field is applied to the liquid crystal material, the electric field, which is substantially parallel to the substrate, is generated, whereby the long axes of the liquid crystal molecules 80 in the central portion of the liquid crystal layer are aligned substantially parallel to the electric field. However, the liquid crystal molecule 80, which are positioned from the substrates 10 and 20 to the central portion of the liquid crystal later, are spirally twisted since the liquid crystal molecules 80 around the substrates 10 and 20 keep their original orientations by an aligning force.

In the EIMD-LCD, a plurality of flit electrodes and second electrodes, being parallel to each other, are formed alternately on each substrate.

Figure 12A:
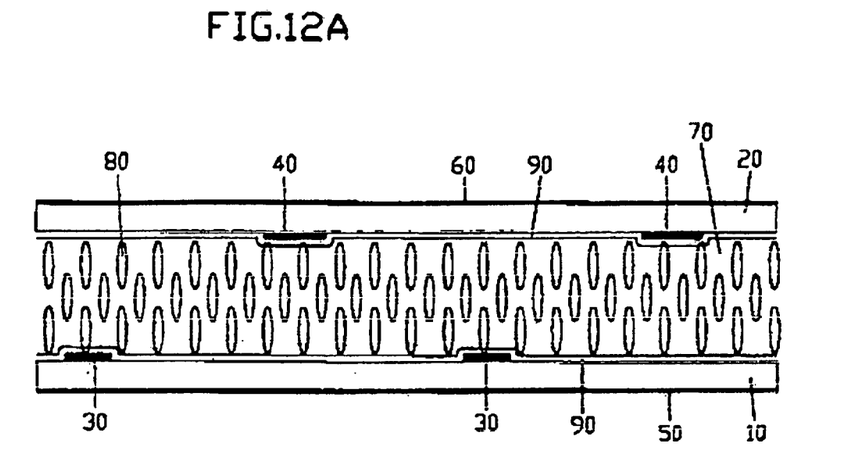
FIGS. 12A to 12B illustrate a basic driving principle of an EIMD-LCD (electrical induced multi domain mode-LCD) according to the embodiment of the present invention.
Figure 12B:
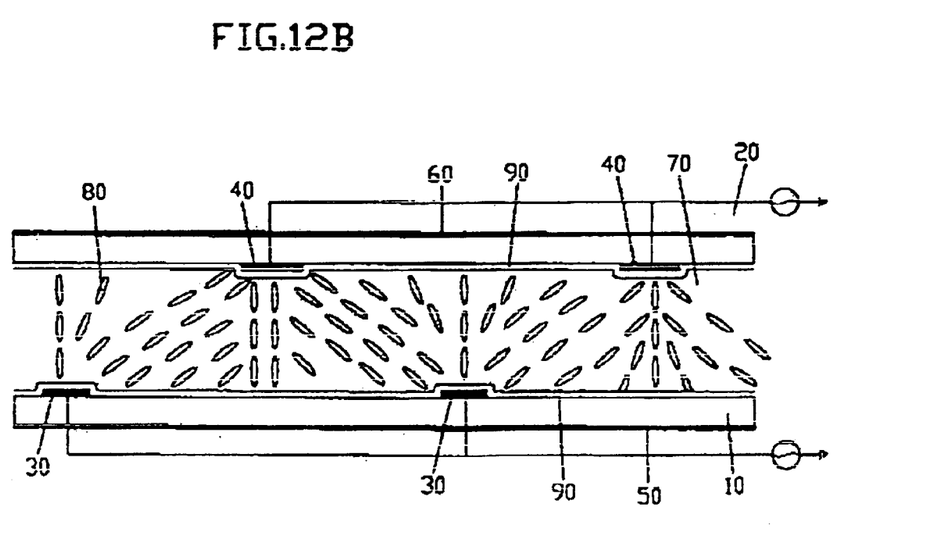

FIGS. 12 and 12B are schematic c views of a principle of the EIMD-LCD according to the embodiment of the present invention As illustrated in FIGS. 12A and 12B, a pair of transparent glass substrates 10 and 20, on which alignment films 90 are formed respectively face each other in a parallel manner. A first linear electrode 30 and a second linear electrode 40 parallel to each other are formed respectively on the inner surface of the substrates 10 and 20, and they are arranged alternately. The liquid crystal material is injected between the two glass substrates 10 and 20, thereby forming a liquid crystal layer 70, and the liquid crystal molecules 80 in the liquid crystal layer 70 are aligned perpendicularly to the two substrates 10 and 20. In addition, the polarizing plates 50 and 60 are attached to outsides of the two substrates 10 and 20 respectively.

It is preferable that the dielectric anisotropy $\Delta \varepsilon$ of the liquid crystal material of the liquid crystal layer 70 is positive, however, the dielectric anisotropy $\Delta \varepsilon$ may be negative.

As illustrated in FIG. 52A, in the absence of the electric field, the liquid crystal molecules 80 in the liquid crystal layer 70 is aligned perpendicularly to the two substrates 10 and 20 by the aligning for of the alignment film 90.

FIGS. 12A and 12B are views of the EIMD-LCD when a sufficient electric field is present in the LCD. The electric field having the inclination angle with respect to the direction perpendicular to the two substrate 10 and 20 is formed by the first and the second electrodes 30 and 40 when the sufficient electric field is present in the LCD. This electric field is formed symmetrically with respect to a plane which is perpendicular to the two substrates 30 and 40 and passes through the two electrodes 30 and 40. In case of a nematic liquid crystal material having positive dielectric anisotropy, the long axes of the liquid crystal molecules 80 is aligned along the direction of the electric field due to the electric field having the above-mentioned inclination direction.

In the above-mentioned IPS-LCD and EIMD-EOC likewise the EOC-LCD, the electrodes 30 and 40 are formed in the saw shape and the retardation of the light is compensated by the regions in which the inclination directions of the liquid crystal molecules are different from each other, thereby obtaining the wide viewing angle.

In the liquid crystal display awarding to the preferred embodiment of the present invention, the two electrodes are formed in the two substrates, the liquid crystal molecules are aligned perpendicularly, and a liquid crystal director is driven by the electric field in the shape of parabola between the two electrodes. Here, the liquid crystal molecules of the liquid crystal layer in both sides of the boundary plane surface are symmetrically formed. Accordingly, the retardation of the projected light is symmetrically compensated, thereby obtaining the wide viewing angle. In addition, a wider viewing angle may be obtained since four regions of which the alignment directions of the liquid crystal molecules are different from one another by forming the electrodes in the saw shape.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A liquid crystal display having a plurality of pixels, comprising:

a first substrate having a plurality of pixels;

a second substrate facing the first substrate;

polarizing plates attached to outer surfaces of the first and second substrates respectively, wherein polarizing directions of the polarizing plates are either perpendicular or parallel to each other, a liquid crystal material injected into the gap between the first and second substrates, molecules of the liquid crystal material being initially aligned perpendicularly to the substrates;

wherein each pixel is divided into a plurality of domains, the domains being distinguished by an average alignment direction of liquid crystal molecules included therein when an electric field is applied to the liquid crystal material, wherein, on average, liquid crystal molecules located at an edge of the domains are aligned symmetrically to each other with respect to a boundary of the domains, and wherein the polarizing directions of the polarizing plates are neither parallel nor perpendicular to at least one of the average alignment directions of the liquid crystal molecules of the domains.

2. The liquid crystal display of claim 1, further comprising compensation film inserted between one of the first and second substrate and corresponding polarizing plates.

3. The liquid crystal display of claim 2, wherein the compensation film has a structure that is selected from the group consisting of uniaxial and biaxial.

4. The liquid crystal display of claim 3, wherein at least one of the average alignment directions of the liquid crystal molecules of the domains is neither parallel nor perpendicular to at least one of the boundary lines of the pixel.

5. The liquid crystal display of claim 4, all of the average alignment directions of the liquid crystal molecules of the domains is neither parallel nor perpendicular to at least one of the boundary lines of the pixel.

6. The liquid crystal display of claim 3, wherein the first and second substrates have a pixel electrode and a common electrode in each inner side.

7. The liquid crystal display of claim 2, wherein at least one of the average alignment directions of the liquid crystal molecules of the domains is neither parallel nor perpendicular to at least one of the boundary lines of the pixel.

8. The liquid crystal display of claim 7, all of the average alignment directions of the liquid crystal molecules of the domains is neither parallel nor perpendicular to at least one of the boundary lines of the pixel.

9. The liquid crystal display of claim 2, wherein the first and second substrates have a pixel electrode and a common electrode in each inner side.

10. The liquid crystal display of claim 1, wherein at least one of the average alignment directions of the liquid crystal molecules of the domains is neither parallel nor perpendicular to at least one of the boundary lines of the pixel.

11. The liquid crystal display of claim 10, all of the average alignment directions of the liquid crystal molecules of the domains is neither parallel nor perpendicular to at least one of the boundary lines of the pixel.

12. The liquid crystal display of claim 1, wherein the first and second substrates have a pixel electrode and a common electrode in each inner side.

* * * * *